(12) United States Patent
Kirklin

(10) Patent No.: US 8,603,686 B2  
(45) Date of Patent: Dec. 10, 2013

(54) METHOD FOR REMEDIAL ACTION IN THE EVENT OF THE FAILURE OF THE COMPRESSOR BYPASS VALVE IN A FUEL CELL SYSTEM

(75) Inventor: Matthew C Kirklin, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1066 days.

(21) Appl. No.: 12/262,874

(22) Filed: Oct. 31, 2008

(65) Prior Publication Data
US 2010/0112385 A1    May 6, 2010

(51) Int. Cl.
*H01M 8/04* (2006.01)

(52) U.S. Cl.
USPC ........... 429/428; 429/413; 429/429; 429/432; 429/435; 429/443; 429/444

(58) Field of Classification Search
USPC ......... 429/430, 408, 434, 429, 413, 444, 428, 429/432, 435, 443
See application file for complete search history.

(56) References Cited

U.S. PATENT DOCUMENTS

| | | | |
|---|---|---|---|
| 5,991,670 A * | 11/1999 | Mufford et al. ................. | 701/22 |
| 2005/0164057 A1* | 7/2005 | Pospichal et al. ............... | 429/25 |
| 2005/0233182 A1* | 10/2005 | Fuss et al. ........................ | 429/12 |
| 2005/0244681 A1* | 11/2005 | Len et al. ......................... | 429/17 |
| 2006/0099469 A1* | 5/2006 | Meltser et al. .................. | 429/24 |
| 2010/0239928 A1* | 9/2010 | Tsuchiya ...................... | 429/430 |

FOREIGN PATENT DOCUMENTS

WO    WO 2007/117018 A1 *   10/2007

* cited by examiner

*Primary Examiner* — Patrick Ryan  
*Assistant Examiner* — Alex Usyatinsky  
(74) *Attorney, Agent, or Firm* — John A. Miller; Miller IP Group, PLC

(57) ABSTRACT

A system and method for controlling the speed of a compressor that provides air to the cathode side of a fuel cell stack in the event that a cathode by-pass valve fails. If a by-pass valve failure is detected, a failure algorithm first disengages the normal flow and pressure algorithms used to control the airflow to the cathode side of the stack. Next, the failure algorithm opens the cathode exhaust gas valve to its fully opened position. Then, in response to a stack power request, the compressor control will be put in an open-loop control where a look-up table is used to provide a particular compressor speed for a power request. An airflow meter will measure the airflow to the stack, and the stack current will be limited based on that airflow.

9 Claims, 2 Drawing Sheets

METHOD FOR REMEDIAL ACTION IN THE EVENT OF THE FAILURE OF THE COMPRESSOR BYPASS VALVE IN A FUEL CELL SYSTEM

BACKGROUND OF THE INVENTION

1. Field of the Invention

This invention relates generally to a system and method for controlling the cathode airflow to a fuel cell stack in the event of a failure of the cathode input by-pass valve and, more particularly, to a system and method for controlling the airflow to the cathode side of a fuel cell stack in the event of a cathode input by-pass valve failure that includes maintaining a cathode exhaust gas valve in an open position, setting the speed of the stack compressor to open-loop control using a look-up table, measuring the airflow to the stack and limiting the current output from the stack based on the measured airflow.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack.

The stack air compressor cannot operate at all flow and pressure combinations required by a fuel cell stack. Therefore, a fuel cell system will typically include a cathode by-pass valve that allows at least some of the airflow to by-pass the fuel cell stack and flow directly to the cathode exhaust. For example, there are points in the operating range of a fuel cell stack that require less cathode airflow than the compressor is capable of delivering at its minimum speed. During these conditions, the by-pass valve is used to redirect some of the compressor airflow to the exhaust.

In some fuel cell systems, the cathode by-pass valve defaults to the open position so that if the valve were to fail, much of the compressor airflow would be sent to the system exhaust. In response to the by-pass valve failure in the open position, the compressor will increase its speed until its maximum speed is reached in an attempt to deliver the airflow necessary to meet the stack power request. Further, with the by-pass valve in the open position, the system algorithms would attempt to increase the pressure in the fuel cell stack by closing the cathode exhaust gas valve. With the cathode exhaust gas valve closed to attempt to control the stack pressure, very little, if any, airflow will get to the stack because it will be flowing out the cathode exhaust through the by-pass valve.

SUMMARY OF THE INVENTION

In accordance with the teachings of the present invention, a system and method are disclosed for controlling the speed of a compressor that provides air to the cathode side of a fuel cell stack in the event that a cathode by-pass valve fails. If a by-pass valve failure is detected, a failure algorithm first disengages the normal flow and pressure algorithms used to control the airflow to the cathode side of the stack. Next, the failure algorithm opens the cathode exhaust gas valve to its fully opened position. Then, in response to a stack power request, the compressor control will be put into an open-loop control where a look-up table is used to provide a particular compressor speed for a power request. An airflow meter will measure the airflow to the stack, and the stack current will be limited based on that airflow.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for controlling a compressor in response to a failure of a cathode by-pass valve in a fuel cell system is merely exemplary in nature, and is in no way intended to limit the invention or its applications or uses.

Figure 1:
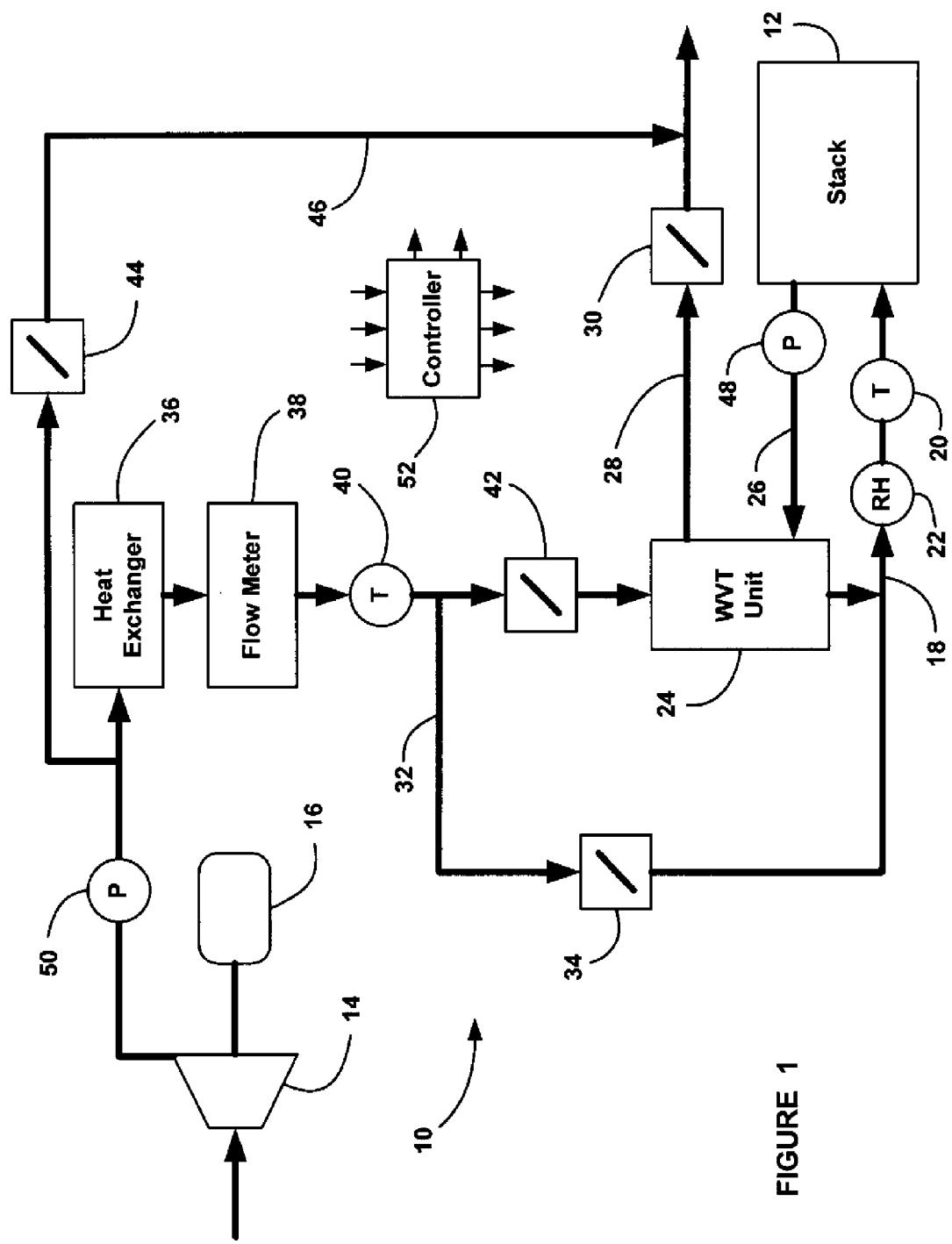
FIG. 1 is a schematic block diagram of a fuel cell system employing a process for controlling a cathode input airflow from a compressor in the event of a failure of a cathode by-pass valve, according to an embodiment of the present invention.

FIG. 1 is a schematic block diagram of a fuel cell system 10 including a fuel cell stack 12. The fuel cell system 10 also includes a compressor 14 driven by a motor 16 that provides an airflow to a cathode side of the fuel cell stack 12 on a cathode input line 18. A temperature sensor 20 measures the temperature of the cathode input air into the stack 12 and an RH sensor 22 measures the relative humidity of the cathode input air into the stack 12. The humidity of the cathode input air is provided by a water vapor transfer (WVT) unit 24 that receives the cathode exhaust gas on cathode exhaust line 26 that typically has a humidity of 100% or more. Water and water vapor from the cathode exhaust gas is used in the WVT unit 24 to humidify the cathode input air that is provided on the input line 18. A pressure sensor 48 in the cathode exhaust line 26 measures the pressure of the cathode side of the stack 12. The cathode exhaust gas is output from the WVT unit 24 on system output line 28 and is controlled by a cathode exhaust gas valve 30. For those times when it may not be desirable to humidify the cathode input air, the cathode input air can be directed around the WVT unit 24 on by-pass line 32 through a by-pass valve 34.

The cathode input air from the compressor 14 is sent to a heat exchanger 36 that reduces the temperature of the air that has been heated as a result of it being compressed by the compressor 14. Additionally, the heat exchanger 36 can provide heat to the cathode input air during certain times, such as cold start up, to heat the fuel cell stack 12 more quickly. A pressure sensor 50 at the output of the compressor 14 measures the discharge pressure of the compressor 14. The cathode input air from the heat exchanger 36 is sent through a flow meter 38, such as a mass flow meter, that measures the flow of the cathode input air to the stack 12. As is well understood to those skilled in the art, the flow of the cathode input air to the stack 12 needs to be tightly controlled to provide the proper cathode stoichiometry so that too much air is not provided to the stack 12 which would have an adverse drying effect on the membranes within the fuel cells in the stack, or too little air that can cause fuel cell instability as a result of oxygen starvation. A temperature sensor 40 measures the temperature of the cathode input airflow to control the heat exchanger 36 and a valve 42 controls the amount of cathode air that flows into the WVT unit 24 or by-passes the WVT unit 24 on the by-pass line 32.

The flow of air from the compressor 14 to the cathode side of the stack 12 is controlled based on the stack current demand and the stack pressure. Being able to control the speed of the compressor 14 to provide the exact amount of air for the desired cathode stoichiometry is typically not possible. Therefore, a cathode by-pass valve 44 is provided that proportionally controls the amount of cathode input air that by-passes the stack 12 or flows to the stack 12 through the heat exchanger 26. The cathode air that by-passes the stack 12 flows through by-pass line 46 and directly to the cathode exhaust gas line 28.

The present invention proposes a process for controlling the speed of the compressor 14 in response to a failure of the by-pass valve 44. As discussed above, typically the by-pass valve 44 will default to a completely open position if it fails. Further, in order to control the pressure of the stack 12, normal control system algorithms would close the exhaust valve 30. However, with the exhaust valve 30 in the closed position, little or no air will flow to the stack 12 because of the low flow resistance path through the open by-pass valve 44. Therefore, the present invention disengages the normal flow and pressure algorithms of the system 10, and opens the exhaust gas valve 30 so that at least some airflow from the compressor 14 will go through the stack 12. Further, the control of the compressor 14 will be switched to an open-loop control where a power request from the stack 12 will cause the compressor 14 to operate at a certain predetermined speed from, for example, a look-up table. At this speed, the airflow through the stack 12 is measured by the flow meter 38, and the maximum current draw from stack 12 is set based on that airflow. Once the airflow to the stack 12 is known, then other system processes can be controlled accordingly, such as the amount of hydrogen provided to the anode side of the stack 12. Because the amount of air provided to the stack 12 will typically be low with the by-pass valve 44 open, the vehicle will typically be in a "limp home" where the amount of power able to be provided by the stack 12 will be minimal. The fuel cell system 10 includes a control system such as a controller 52 that controls the fuel cell system 10 including the speed of the compressor 14 and the position of the valves 44 and 30, as discussed in more detail below.

Figure 2:
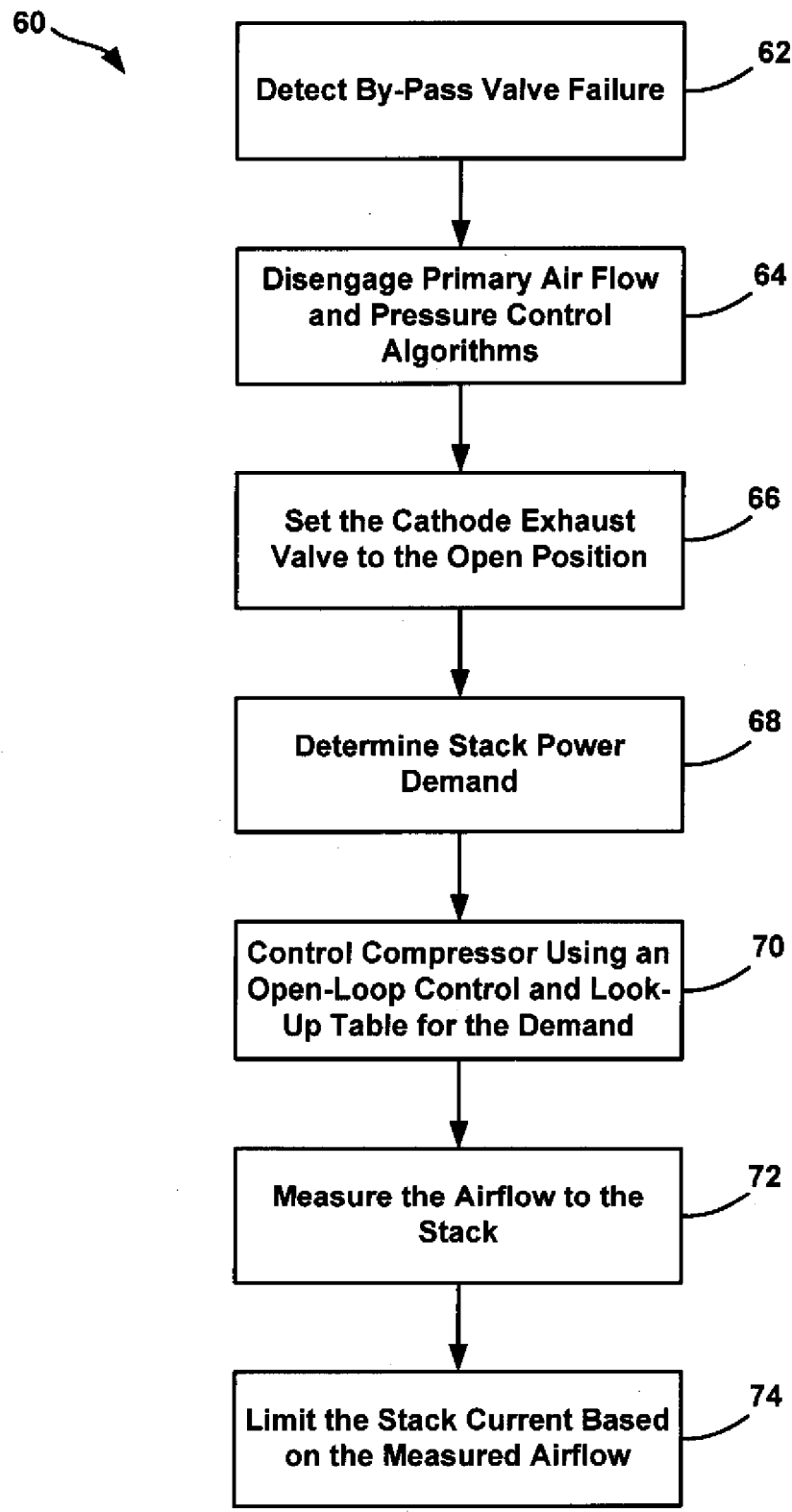
FIG. 2 is a flow chart diagram showing a process for controlling the compressor in response to a cathode by-pass valve failure.

FIG. 2 is a flow chart diagram 60 showing the operation for controlling the speed of the compressor 14, such as by using the controller 52 as discussed above. At box 62, the flow control algorithms will detect a failure of the by-pass valve 44, and will disengage the primary airflow and pressure control algorithms at box 64. The algorithm will then set the cathode exhaust valve 30 to its fully open position at box 66. The algorithm will then determine a stack power demand at box 66, and the speed of the compressor 14 will be controlled at box 70 using an open-loop control and a look-up table for the demand. Particularly, for a particular stack power request, the speed of the compressor 14 will be set at some predetermined speed for that request. The airflow to the stack 12 is then measured by the flow meter 38 at box 72, and the stack current is limited at box 74 based on the measured airflow.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for controlling the speed of a compressor that provides an airflow to a cathode side of a fuel cell stack, said method comprising:
   determining that a cathode by-pass valve has failed in a completely open position that controls the flow of air from the compressor to a cathode exhaust without going through the stack;
   disengaging primary airflow and pressure control algorithms in response to the valve failure;
   setting a cathode exhaust valve to an open position;
   determining a stack power request from the fuel cell stack;
   measuring an airflow from the compressor to the fuel cell stack; and
   controlling the compressor using an open-loop control where the speed of the compressor is set based on the stack power request and the measured airflow to the stack is used to determine a maximum current draw from the stack.

2. The method according to claim 1 wherein using an open-loop control includes determining the compressor speed from a look-up table.

3. The method according to claim 1 wherein measuring the airflow includes using a mass flow meter.

4. A method for controlling the speed of a compressor that provides an airflow to a cathode side of a fuel cell stack, said method comprising:

determining that a cathode by-pass valve has failed that controls the flow of air from the compressor to a cathode exhaust without going through the stack;

disengaging primary airflow and pressure control algorithms in response to the valve failure;

determining a stack power request from the fuel cell stack; and controlling the compressor using an open-loop control where the speed of the compressor is set based on the stack power request.

5. The method according to claim 4 wherein determining that a cathode by-pass valve has failed includes determining that a cathode by-pass valve has failed in a completely open position.

6. The method according to claim 4 further comprising setting a cathode exhaust valve to an open position when the control algorithms are disengaged.

7. The method according to claim 4 further comprising measuring an airflow from the compressor to the fuel cell stack where the measured airflow to the stack is used to determine a maximum current draw from the stack.

8. The method according to claim 7 wherein measuring the airflow includes using a mass flow meter.

9. The method according to claim 4 wherein using an open-loop control includes determining the compressor speed from a look-up table.

\* \* \* \* \*